US006466944B1

(12) United States Patent
Stokes

(10) Patent No.: US 6,466,944 B1
(45) Date of Patent: Oct. 15, 2002

(54) METHOD FOR CREATION, MANAGEMENT, AND USE OF FILES CONTAINING MULTIPLE VIRTUAL DATA STREAMS USING STANDARD FILE SYSTEM APIS

(75) Inventor: Randall K. Stokes, Provo, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/453,990

(22) Filed: Dec. 2, 1999

(51) Int. Cl.$^7$ .............................................. G06F 17/30
(52) U.S. Cl. ........................ 707/102; 707/10; 707/200
(58) Field of Search .................... 707/10, 200, 102; 709/218, 226, 231; 713/187, 500; 705/54, 57, 80

(56) References Cited

U.S. PATENT DOCUMENTS 6,119,116 A * 9/2000 Rose ............................ 707/10
6,185,574 B1 * 2/2001 Howard et al. ............. 707/200

FOREIGN PATENT DOCUMENTS

WO    WO 95/01605    1/1995

OTHER PUBLICATIONS

Rob Pike, Dave Presotto, Ken Thompson, Howard Trickey and Phil Winterbottom, "The Use of Name Spaces in Plan 9", 1995, 6 pages.
Terrehon Bowden and Bodo Bauer, "Collecting System Information", 1999, 31 pages.

* cited by examiner

Primary Examiner—Diane D. Mizrahi
(74) Attorney, Agent, or Firm—Marger Johnson & McCollom, P.C.

(57) ABSTRACT

A file containing a transformation template allows a user to access system data. The transformation template can include multiple data streams for accessing different system data, or the same data in different ways. The transformation template can format system data both on read and write commands. The transformation template is accessed using the six basic file system APIs. The transformation template instructs the system as to how the system data is to be manipulated. The transformation template is saved on the file system using a write API and writing a virtual I/O command. The transformation template is then accessed. The transformation template generates the data dynamically either from a memory location or from a generating function, and formats it according to the active data stream.

18 Claims, 4 Drawing Sheets

METHOD FOR CREATION, MANAGEMENT, AND USE OF FILES CONTAINING MULTIPLE VIRTUAL DATA STREAMS USING STANDARD FILE SYSTEM APIS

FIELD OF THE INVENTION

This invention pertains to the capture of statistics regarding computer operations and managing the configuration of system data.

BACKGROUND OF THE INVENTION

One of the tough problems in file systems, operating systems, and any other "under the covers" application is allowing an easy method for capturing statistics and managing the configuration. Previous systems presented different approaches for capturing statistics and managing the configuration. For example, the Unix and Plan 9 operating systems provided special file system types to allow kernel and other system information to be viewed and manipulated as files. These file systems contained special directories that represented various parts of the operating system. By reading and writing the files in these directories, system information could be viewed and changed. This allowed the system to be monitored and configured without requiring special interfaces.

The designers of the file systems decided what would be made available and how it would be formatted. The access to the various system parameters was coded into the implementation of the file system type. While the users could look at what was provided, they were left with no easy way to extend the functionality to include other parts of the system.

The concept of using the file system and the file system APIs as a simplified method for management is a sound concept. As noted above, the first step has been taken. Systems like Unix and Plan 9 expose files that can be read and written to manipulate system parameters. The next step is to allow the administrator of a system the flexibility to create and manage the files themselves. An administrator should be able to decide what things are to be exposed and how they should look. The creation and maintenance of these management files should be as easy as the creation and management of any other file in the file system.

Accordingly, the need remains for a simple way to set up and maintain files that can be used to manage system parameters and state.

SUMMARY OF THE INVENTION

A file containing a transformation template is created. Such a file, containing a transformation template and residing on a volume designated for virtual I/O operations, is know as a virtual file. The transformation template can include multiple data streams. The transformation template instructs the system as to how the system data is to be manipulated. The transformation template is saved in the file using a standard write API by writing a special "virtual I/O" command followed by the transformation template. When a standard read or write is done on a file containing a transformation template (a virtual file), the transformation template is then accessed. The file system uses the transformation template to locate the system data and formats it according to the instructions given in the template for the active data stream. The results of the read or write operation are returned to the caller. The use of the transformation template is invisible to the caller, who sees it as a normal file system operation.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
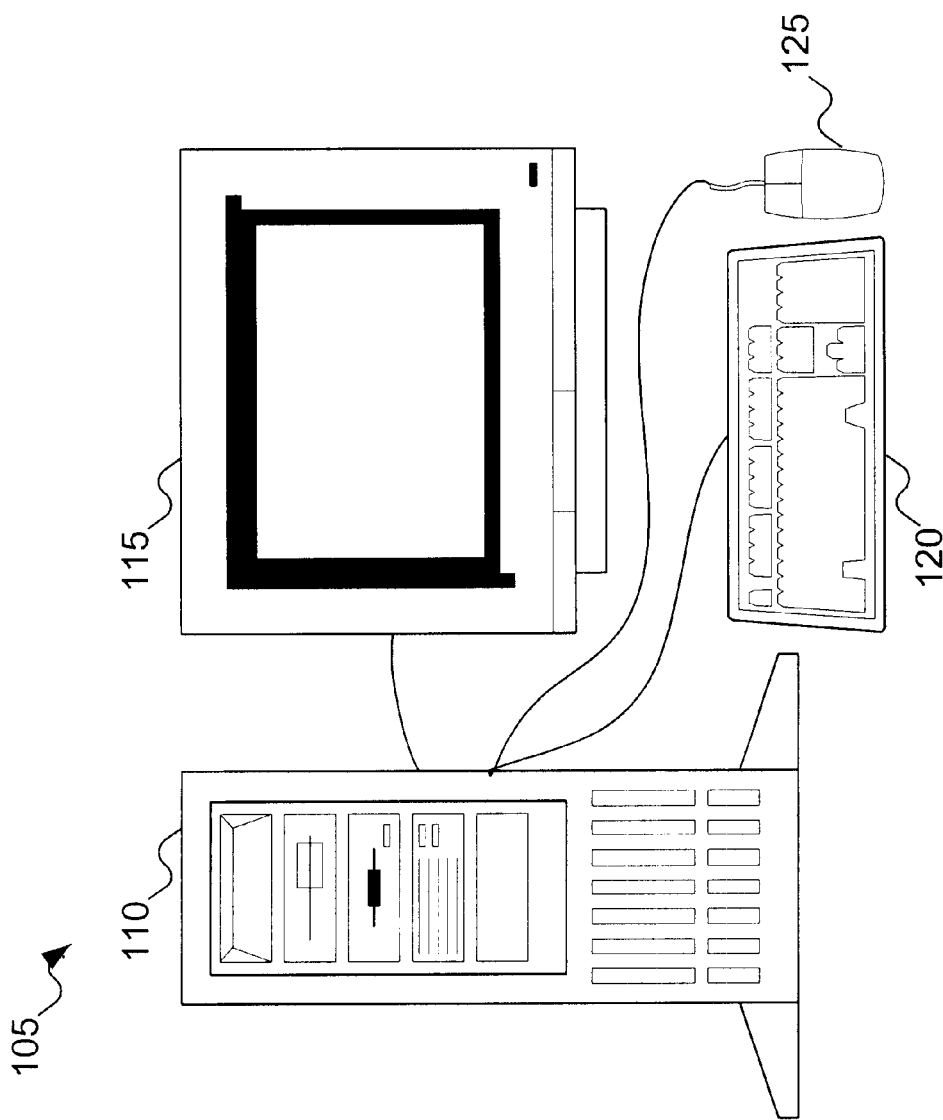
FIG. 1 is a block diagram that shows a computer system on which the virtual data streams can operate.

FIG. 1 shows a computer system 105 on which the virtual data streams can operate. Computer system 105 includes a computer 110, a monitor 115, a keyboard 120, and a mouse 125. Optional equipment not shown in FIG. 1 can include a printer and other input/output devices. Also not shown in FIG. 1 are the internal components of a conventional computer system 105: e.g., a central processing unit, memory, input/output bus, etc.

In the preferred embodiment, there are two types of files in a file system: normal files and virtual files. Normal files are files that contain data that are accessed and manipulated directly. Normal files are what most users think of as files on a system. Virtual files are files that appear to be ordinary files but contain instructions for the file system to access data stored elsewhere and manipulate the data. For example, if a user wants to know the cache hit percentage of a buffer cache, the user can issue a read on the file called BufferCacheHitPercentage. The data coming back would be a number representing the percentage. The user can also write to a file called NumBufferCacheEntries to change the number of buffer cache entries on the system. Virtual files do not actually store the information they present to the user, but rather contain transformation templates which instruct the file system as to where it can find the required information, and how to format that information for presentation to the user. In the preferred embodiment, all virtual files contain transformation templates. The file system is modified to treat only files on designated volumes as virtual files.

Figure 2:
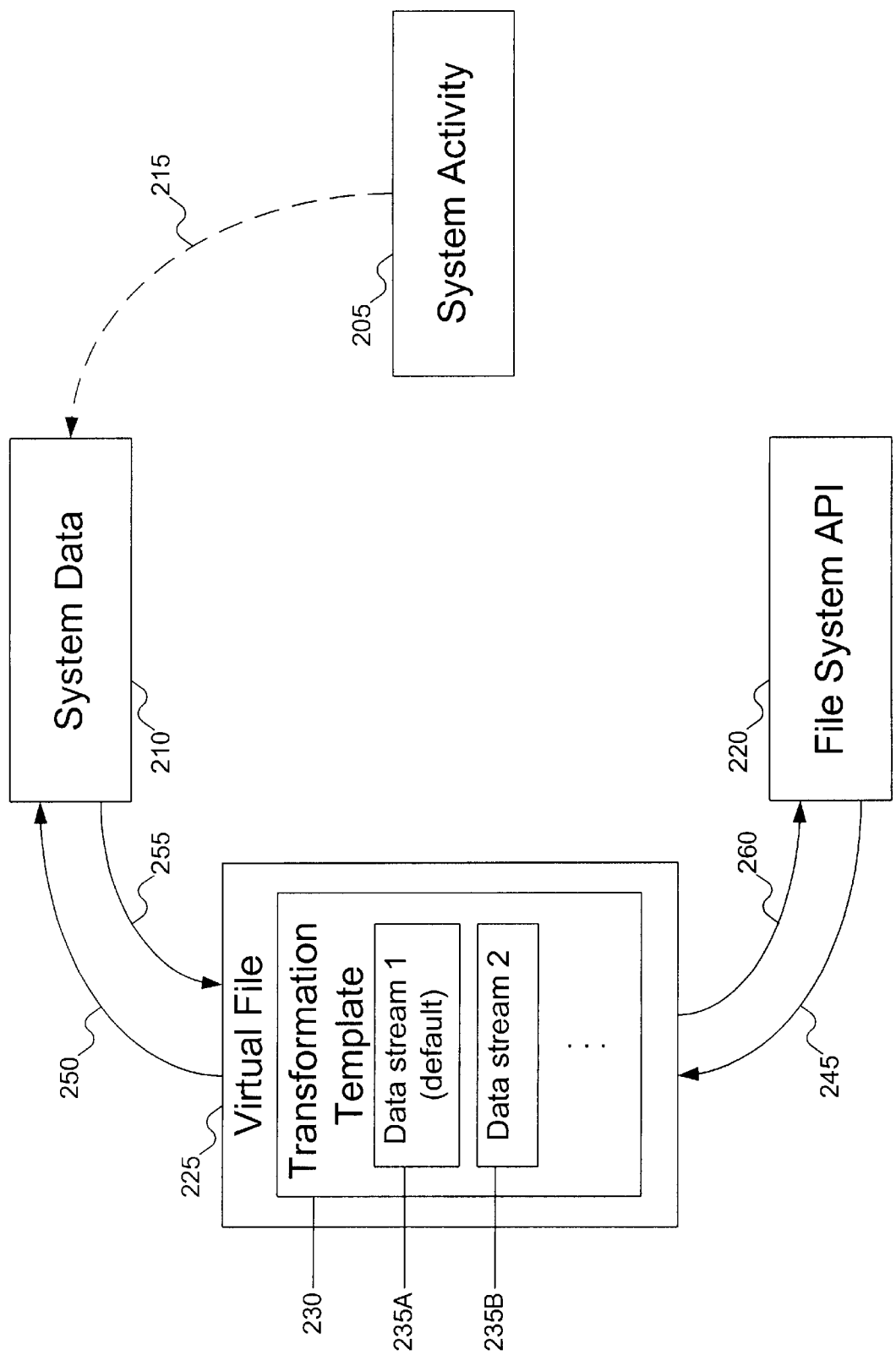
FIG. 2 is a data flow diagram that shows how a transformation template is used to access system data according to the invention in the system of FIG. 1.

FIG. 2 shows how a transformation template is used to access system data. As system activity 205 occurs, the system activity 205 is captured in the system data 210. This capture is represented by arrow 215. System activity 205 includes all types of activities: file accesses, cache misses, and memory utilization represent only three of numerous possible types of system data 210 to be captured.

When a user wants to access system data 210, the user opens the appropriate virtual file 225 from API 220, as indicated by arrow 245. In the preferred embodiment, there can be more than one virtual file 225. The virtual file 225 contains a transformation template 230 that in turn contains data stream definitions 235A and 235B. A person skilled in the art will recognize that there can be any number of data streams in transformation template 230. One of the data streams is designated as the default data stream 235A and is used for normal reads and writes. The transformation template 230 serves both to allow indirect access to the system data 210 and to format the system data 210. In the preferred embodiment, the virtual file 225 is stored in a volume designated for virtual files.

After virtual file 225 has been opened and a data stream 235A or 235B has been selected from transformation template 230, the contents of the selected data stream are used to locate and access the system data 210 as indicated by arrow 250. If data is to be returned to the user as indicated by arrow 255, the selected data stream 235A or 235B in transformation template 230 formats the data accordingly. Finally, the result of the formatting is returned to the user via API 220, as indicated by arrow 260.

In the preferred embodiment, the transformation template 230 is written in Extensible Markup Language (XML). However, a person skilled in the art will recognize that the transformation template can be written in other languages.

The default action when accessing the transformation template 230 is to use the default data stream 235A. However, a single transformation template 230 can store multiple data streams 235A and 235B. Alternate data streams, such as data stream 235B, are accessed by writing a virtual I/O command to the virtual file 225. This virtual I/O command tells the file system which data stream 235A and 235B in transformation template 230 to use. For example, Appendix 1 shows a transformation template that can manipulate a toaster object. The transformation template has seven data streams: default (which is unnamed), toastTemp, toasterStructure, toasterAccess, toasterStatus, shorthelp, and help.

The first data stream in Appendix 1 has no name and will be used as the default for read and write requests that have no virtual I/O command preceding them. It takes a long value from eight bytes past the memory location for toasterObj and converts it to ASCII, then combines the value with the leading and trailing text. When this data stream is read it will return "The current toast temperature is set to 125 degrees Fahrenheit", assuming the toast temperature value is 125. When this data stream is written, the toast temperature value will be converted from ASCII to a long value and then written to eight bytes past the memory location for toasterObj.

The toastTemp data stream is similar to the default data stream, but has no leading and trailing text.

A read on the toasterStructure data stream returns 24 bytes of raw data representing, in this case, a structure of toaster data. A write to this data stream will write up to 24 bytes of binary data into memory starting at toasterObj.

The toasterAccess data stream uses user-written functions (ReadToasterVariable and WriteToasterVariable) to read and write the virtual contents of the file. The value contained in the readfunc and writefunc tags ("temperature" in this case) is passed to the read/write functions, as well as a buffer for the read/write operation.

The toasterStatus data stream allows a command with a response to be sent to the function ProcessToasterCommand. The write operations are taken to be commands and the read operations read the response.

The last two data streams, shorthelp and help, are data taken directly from the transformation template. In the example, a read will result in a help message. As illustrated by Appendix 1, there are four types of data streams. These are:

Data in the template. One source of virtual data is the template itself. This is useful for putting in descriptive text. For example, one data stream in a virtual file may return the contents of the memory location containing the size of the file cache. Another data stream in the same file could be of the "data" type and contain help text that described what the file cache size represents and how changing it affects system performance. In addition, the "data" type data streams can be used to hold symbolic link and junction information for files designated as "link" type files.

Contents of a memory location. This type of data stream renders its information from a memory location on the server. The template designates where the memory location is, how long the data is, and whether it should be converted to ASCII or returned as "raw" data.

Information rendered by a function. In this type of data stream two functions are specified, one for accepting data written to the file, and the other to generate data to be read from the file. This gives great flexibility as to the type of virtual data that can be handled. The format of the data is determined by the function being called.

Information rendered by a command function. A data stream of this type is similar to the function data stream except there is only one function specified. This function can be written to. It then generates a buffered response. Reads on this data stream are then satisfied from the buffer.

As mentioned previously, each virtual file must contain a transformation template. A file with no contents, or with contents that are not recognized as a transformation template cannot be used for virtual I/O. But the writing of the transformation template to the file cannot be done in the normal way, because normal reads and writes attempt to use the default data stream in the transformation template, and a new file has no transformation template. One solution would be to always write to the file in a normal way if there is no transformation template. This is simple, but does not allow for updating templates in virtual files that already contain a transformation template. In the preferred embodiment, transformation templates are written using a virtual I/O command. Virtual I/O commands are used to indicate that the user wishes reads and writes to be routed to either a particular virtual data stream or to the real contents of the file. A virtual I/O command is always written to offset zero of the file and must be the first thing found in the data passed to the write function. In the preferred embodiment the virtual I/O command is recognized as an XML string starting with the <virtualIO>tag.

Figure 3:
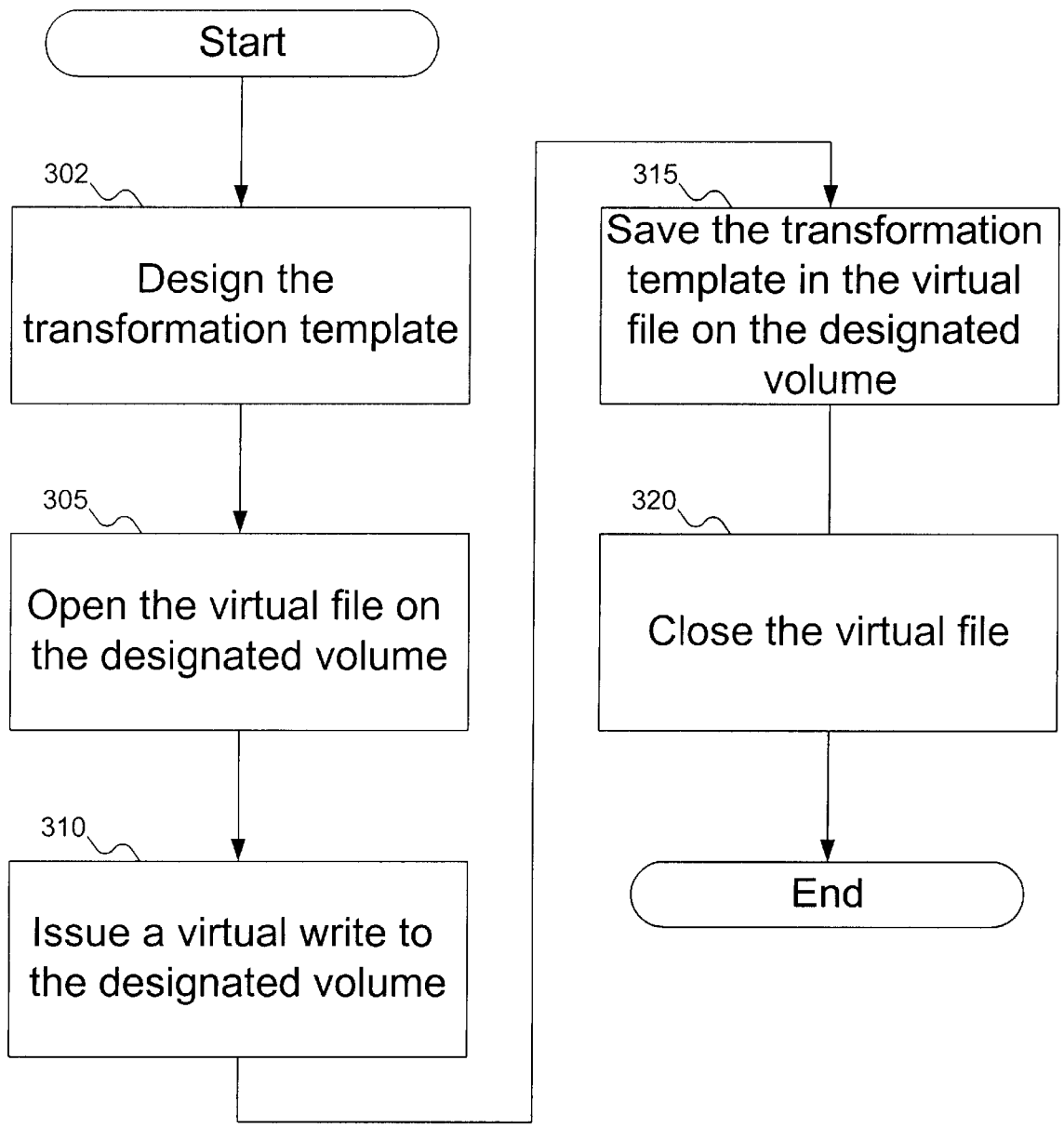
FIG. 3 is a flowchart of how the transformation template of FIG. 2 is created.

FIG. 3 shows a flowchart of how a transformation template is saved to a virtual file. Because the instructions in a transformation template must be written as the actual contents of the file, a virtual command is first sent followed by a transformation template. At step 302, the transformation template is designed. At step 305 the target file is opened. At step 310, the system writes a virtual I/O command to the target file instructing the file system that subsequent writes to this file will contain data that will be treated as real file contents, not as data that should be routed to a virtual data stream. At step 315, the transformation template is saved in the virtual file. Finally step at 320 the file is closed. At this point, assuming that the transformation template is valid, the user has a fully functional virtual file that returns data as dictated by the various data streams in the transformation template.

Figure 4:
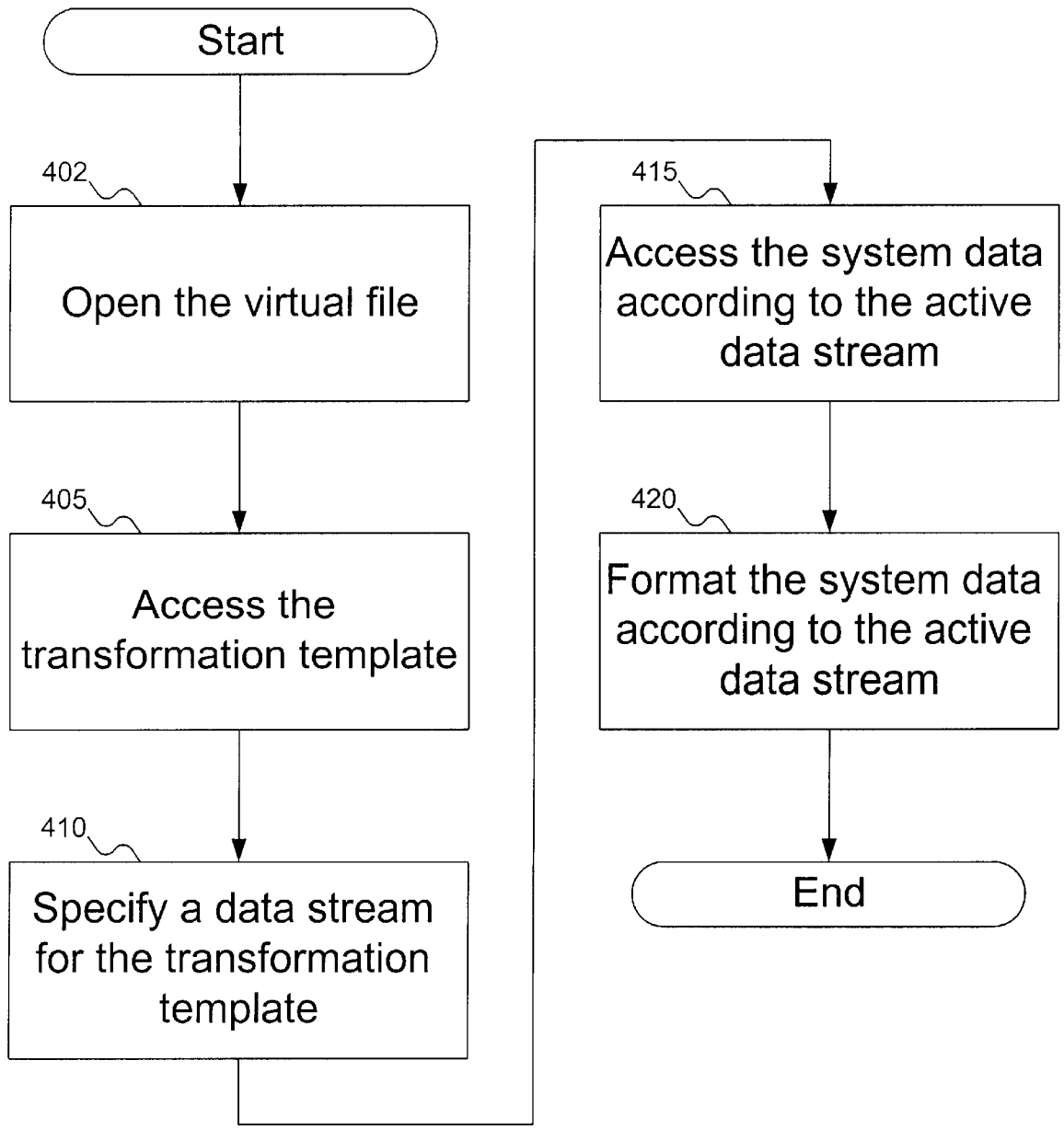
FIG. 4 is a flowchart of how the transformation template is used to access system data.

Appendix 2 shows an example of a virtual I/O command, using XML tags, that instructs the file system to use the data stream named "shorthelp" to process subsequent read and writes by this user to this virtual file. FIG. 4 shows a flowchart of how a virtual file is used to access system data via its transformation template. First, at step 402 the file is opened. At step 405, the transformation template within the virtual file is accessed. Then, at step 410, a data stream in the transformation template is selected by writing an optional virtual I/O command. If no virtual I/O command is written then the default data stream is selected. At step 415, system data is retrieved as directed by the section of the transformation template defining this data streams behavior. Because each transformation template can have multiple data streams, different data can be retrieved depending on the selected data stream. Finally, at step 420, the system data is formatted according to the data stream and presented to the user. A person skilled in the art will recognize that the sequence of steps in FIG. 4 will vary depending on how the data is accessed. For example, when data is written to the system, the data generally will be formatted before it is written.

Appendix 3 shows how a virtual data stream can be read through a PERL script. This script takes the name of the virtual file as the first parameter and an optional data stream name as the second parameter. If the data stream is not specified then the actual contents of the file are read. This particular script cannot be used to read the default data stream. To read the default data stream the script could be changed to not send down a virtual I/O command before doing the read. Alternatively a "cat" or "type" command could be used in place of the script when only accessing the default data stream.

Some of the advantages of using virtual files to capture statistics and manage the configuration are as follows:

User configurable virtual data. In current file systems that have attempted a virtual data type of access, there is a lot of hard coded and pre-configured information. They are not very extensible. Transformation templates, on the other hand, are easy to establish and change, as the user desires.

All functionality is achieved using the six basic file system operations. A user can create, modify, and use these virtual data files from a PERL (or other scripting language) script coming over a generic client. The system does not require any special modes or attributes to create and open the files.

Multiple virtual data streams. This is a unique and powerful tool, allowing users to specify a variety of formats and information to come from a single file. Easy protection of non-file system data. Since the virtual files are files in the truest sense, their access can be protected in the same way normal files are protected. Thus, a system can have a virtual data file that allows access to sensitive data and limit the access to specific users by assigning appropriate file access rights.

The use of XML or a similar language. Using XML allows Document Type Definition (DTD) validation of the templates and commands prior to parsing. Also it may well be worthwhile attempting to establish standardized XML tags for this type of file access.

Two issues regarding transformation templates merit mention. First, multiple readers and writers can create a potential problem. When a transformation template references memory, a function, or a command function, the results are preferably put in a buffer specific to that open instance. This buffering gives the needed consistency of reads when there are multiple readers and writers to the same virtual file. In addition to giving consistency of data on reads, this means that if a user closes and re-opens a file, the results from any previous command are gone. Also, reads that read at an offset other than zero, reference the results buffer without refreshing it.

Second, because the virtual I/O commands are written to a file, by default the offset of subsequent reads and writes is set to occur just past the data that was supposedly written. The virtual file system preferably keeps track of the length of the virtual I/O command and adjusts the offset so that subsequent reads and writes appear to start at offset zero. Care should be used when seeking to an offset other than zero in a virtual file. Because of the adjustments for the virtual I/O command, the offset might not be where the user expected it. The system looks at the offsets coming in. As long as the offsets are greater than the length of the original virtual I/O command, they are adjusted to account for that length. If the offset is ever less than the length of the virtual I/O command, the file system assumes that a seek has been done and no longer makes the adjustment. This means a seek to location zero will go to the front of the data being rendered by the virtual file.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

APPENDIX 1

```
<?xml version="1.0" encoding="UTF-8"?>
<!DOCTYPE transform SYSTEM "virtualTemplate.dtd">
<transform>
    <datastream>
        <location symname="toasterObj" offset="8">
            <readloc>
                <format><long signed="yes"/></format>
                <leadingtext>The current toast temperature is set to </leadingtext>
                <trailingtext>degrees Fahrenheit.</trailingtext>
            </readloc>
            <writeloc>
                <format><long/></format>
            </writeloc>
        </location>
    </datastream>
    <datastream name="toastTemp">
        <location symname="toasterObj" offset="8">
            <readloc>
                <format><long signed="yes"/></format>
            </readloc>
            <writeloc>
```

APPENDIX 1-continued

```
                <format><long/></format>
            </writeloc>
        </location>
    </datastream>
    <datastream name="toasterStructure">
        <location symname="toasterObj">
            <readloc>
                <format><raw length="24"/></format>
            </readloc>
            <writeloc>
                <format><raw length="24"/></format>
            </writeloc>
        </location>
    </datastream>
    <datastream name="toasterAccess">
        <function>
            <readfunc symname="ReadToasterVariable">temperature</readfunc>
            <writefunc symname="WriteToasterVariable">temperature</writefunc>
        </function>
    </datastream>
    <datastream name="toasterStatus">
        <command symname="ProcessToasterCommand">full</command>
    </datastream>
    <datastream name="shorthelp">
        <data>Information about the toaster</data>
    <datastream>
    <datastream name="help">
        <data>
This file contains information dealing with the toaster object.
The data streams are as follows:
    default:           The toast temperature with text.
    toastTemp:         The toast temperature (with no additional text).
    toasterStructure:  The raw data from the toasterStructure.
    toasterAccess:     A function that can allow access to any field in the toaster object.
    toasterStatus:     Returns the contents of all fields in the toaster object.
        </data>
    </datastream>
</transform>
```

APPENDIX 2

```
<?xml version="1.0" encoding="UTF-8"?>
<!DOCTYPE virtualIO SYSTEM "command.dtd">
<virtualIO>
```

APPENDIX 2-continued

```
    <datastream name="shorthelp" type="data"/>
</virtualIO>
```

APPENDIX 3

```

# PERL script to read a data stream from a virtual file

if (($#ARGV > 1) or ($#ARGV <= -1))
{
    die "USAGE: readVirt.pl filename [data stream]\n";
}
open(FILE, "+<".$ARGV[0]) or die "Error opening $ARGV[0]";
if($#ARGV == 0)
{
    $command = "<virtualIO><file/></virtualIO>";
}
else
{
    $command = "<virtualIO><datastream name=\"".$ARGV[1]."\"/></virtualIO>";
}
syswrite FILE, $command, length($command);
$len = 999;
while ($len > 0)
{
    $len = sysread FILE, $buf, 1000;
    print("$buf");
}
close(FILE);
```

I claim:

1. A method for allowing a user to access system data on a computer including a file system using file system application program interfaces (APIs), the method comprising:

creating a transformation template in a file that can access the system data;

saving the transformation template in the file on the file system;

opening the file containing the transformation template on the file system; and accessing the system data through the transformation template on the file system.

2. A method according to claim 1 wherein accessing the system data includes reading the system data through the transformation template contained in the file on the file system.

3. A method according to claim 1 wherein accessing the system data includes writing the system data through the transformation template contained in the file on the file system.

4. A method according to claim 1 wherein the transformation template includes multiple data streams for accessing the system data.

5. A method according to claim 1 wherein saving the transformation template includes using the file system APIs to save the transformation template to the file on the file system.

6. A method according to claim 5 wherein using the file system APIs includes specifying that the transformation template is to be saved to the file without processing.

7. A computer-readable medium containing a program to allow a user to access system data on a computer including a file system using file system APIs, the program comprising:

creation software to create a transformation template in a file that can access the system data;

saving software to save the transformation template in the file on the file system;

opening software to open the file containing the transformation template on the file system; and accessing software to access the system data through the transformation template on the file system.

8. A computer-readable medium containing a program according to claim 7 wherein the accessing software to access the system data includes reading software to read the system data through the transformation template contained in the file on the file system.

9. A computer-readable medium containing a program according to claim 7 wherein the accessing software to access the system data includes writing software to write the system data through the transformation template contained in the file on the file system.

10. A computer-readable medium containing a program according to claim 7 wherein the transformation template includes multiple data streams for processing the system data.

11. A computer-readable medium containing a program according to claim 7 wherein the saving software to save the transformation template includes using software to use the file system APIs to save the transformation template to the file on the file system.

12. A computer-readable medium containing a program according to claim 11 wherein the using software to use the file system APIs includes specification software to specify that the transformation template is to be saved to the file without processing.

13. An apparatus for a program to allow a user to access system data on a computer including a file system using file system APIs, the system comprising:

a creating unit to create a transformation template in a file that can access the system data;

a saving unit to save the transformation template in the file on the file system;

an opening unit to open the file containing the transformation template on the file system; and an accessing unit to access the system data through the transformation template on the file system.

14. An apparatus according to claim 13 wherein the accessing unit to access the system data includes a reading unit to read the system data through the transformation template contained in the file on the file system.

15. An apparatus according to claim 13 wherein the accessing unit to access the system data includes a writing unit to write the system data through the transformation template contained in the file on the file system.

16. An apparatus according to claim 13 wherein the transformation template includes multiple data streams for accessing the system data.

17. An apparatus according to claim 13 wherein the saving unit to save the transformation template includes a using unit to use the file system APIs to save the transformation template to the file on the file system.

18. An apparatus according to claim 17 wherein the using unit to use the file system APIs includes a specification unit to specify that the transformation template is to be saved to the file without processing.

* * * * *